United States Patent [19]

Dodd et al.

[11] Patent Number: 4,468,730
[45] Date of Patent: Aug. 28, 1984

[54] DETECTION OF SEQUENTIAL DATA STREAM FOR IMPROVEMENTS IN CACHE DATA STORAGE

[75] Inventors: P. David Dodd; Ronald L. Blickenstaff; Richard L. Coulson; Robert J. Moreno, all of Boulder; Brian E. Trede, Lafayette, all of Colo.

[73] Assignee: Storage Technology Corporation, Louisville, Colo.

[21] Appl. No.: 325,350

[22] Filed: Nov. 27, 1981

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,566,358 | 2/1971 | Hasbrouck | 364/200 |
| 4,084,231 | 4/1978 | Capozzi et al. | 364/200 |
| 4,086,629 | 4/1978 | Desyllas et al. | 364/200 |
| 4,296,465 | 10/1981 | Lemak | 364/200 |
| 4,371,927 | 2/1983 | Wilhite et al. | 364/200 |
| 4,371,929 | 2/1983 | Brann et al. | 364/200 |
| 4,394,732 | 7/1983 | Swenson | 364/200 |

*Primary Examiner*—Jerry Smith
*Assistant Examiner*—Mark P. Watson
*Attorney, Agent, or Firm*—Woodcock Washburn Kurtz Mackiewicz & Norris

[57] ABSTRACT

A method for detection of a sequential data stream which can be performed without host computer intervention is disclosed featuring examination of a data record and channel program during read operations for signals indicative that the data is not part of a sequential data stream, for example, embedded seek instructions. If a particular sought for record does not contain such indications, the successive record or records may then be staged to a faster access memory device such as a solid-state cache. The invention is described in a plug-compatible, software-transparent configuration.

12 Claims, 2 Drawing Figures

DETECTION OF SEQUENTIAL DATA STREAM FOR IMPROVEMENTS IN CACHE DATA STORAGE

FIELD OF THE INVENTION

This invention relates to the field of data storage and management. More particularly, the invention relates to a method for detecting whether a particular data set having been requested from long term storage by a host computer is likely to be part of a sequence of such sets to be called for.

BACKGROUND OF THE INVENTION

Modern data processing systems typically comprise a host computer, consisting of an arithmetic and logic unit and a main memory unit for containment of data and instructions presently being processed, and long-term storage means for storage of data and processing instructions at other times. The long-term storage means is typically connected to the host computer by means of a channel. When the host desires a particular data set or record, it issues a command over the channel to the long-term storage means, which then reads the data, from whatever medium it is stored upon, e.g., magnetic disk or tape memory media, over the channel into the main memory of the host. The substantial length of time required to retrieve data from long term storage limits the throughput or usage of the host computer. To minimize this loss of use of the host computer, the host will typically issue a series of requests for data and then perform other tasks while the data is being retrieved from long term disk or tape memory. However, even when this "queueing" is performed there is substantial host computer computation time lost due to the time required for accessing data. Accordingly, it has remained an unsolved problem in the art and it is an object of the present invention to improve host computer throughput by reducing queueing times.

It has been proposed in the prior art that such queueing times be reduced by "staging" data surrounding all data which is the object of a "SEEK" command issued by a host from a disk or tape memory into a solid-state memory of much higher access speed. The solid-state memory is located external to the host, i.e., outboard of the channel from the host. Thus when the host issues subsequent "READ" commands, the data sought may be already contained in the high speed solid-state memory and can be supplied to the host more or less instantaneously. However, if all data sets surrounding records accessed by the host are read into a solid-state memory external to the host as described above, the problem of queueing is not entirely eliminated, as then the channel and director usage time consumed while data is read into cache memory is added to the actual latency time required for the data set to be read from disk into the cache memory.

Moreover, it will be appreciated that there are generally two ways in which data is accessed by a host computer. All the data in a given data set may be called for by the host at a given time, or the host may initiate a separate call for each portion of the data set as each is required. In the first case, addition of the cache memory to the system adds no performance improvement, as but a single latency time is required to satisfy each input/output request. In the second case, wherein each individual host instruction is part of a sequence of instructions typically directed to access successive portions of a physical record such as a tape or disk drive, there is latency time for each call to access a portion of the data set. In this situation, the latency time can be reduced to that of a single access operation involving a single latency time, if successive portions of the data are read into the cache, as the subsequent requests can then be satisfied directly from solid-state memory without involving second and successive physical access operations. That is, if the data is cached in anticipation of a subsequent "SEEK" command it will be available immediately upon issuance of a "READ" command. Accordingly, it is desirable that means be provided for determining which data supplied to a host in response to input/output requests are likely to be part of a sequence of such requests such that only the sequential data called for in requests will be cached. In this way use of the cache will be optimized at no cost to non-sequential operations.

It would not, of course, be impossible for the host computer to issue a signal indicating whether or not a particular data set called for is part of a sequence of such sets. This would of course simplify the decision as to whether or not to "stage" the subsequent record from the long-term data storage means into a cache memory. However, present day computing systems of commercial importance (such as the IBM Corporation's line of computers) do not provide such a signal. Nor is it desirable to modify these computers, nor in particular their operating systems, in order to provide such a signal as such modifications are difficult to implement correctly and are not popular with computer users.

Accordingly, it is desirable to render the caching of data function more efficient by using improved means and methods to determine whether a particular data set sought by a host computer is part of a sequence of such sets (in which event the subsequent sets would be cached) while data which is not amenable to efficient caching is processed in the same manner as in the prior art.

It is a further object of the invention to provide a system in which sequential data sets can be cached so as to improve throughput of a host computer system, without requiring modification to the host.

Yet another object of the invention is to provide a means and method for detecting whether or not a data record is part of a sequence of such records, wherein the means and method operates using information contained within the data record itself, whereby implementation of the method of the invention is rendered simple and relatively inexpensive.

SUMMARY OF THE INVENTION

The present invention satisfies the needs of the art and the objects of the invention as noted above by examining each data record that is read from long-term data storage means by a host computer. Control signals contained in the data and the (conventional) channel program are used to provide indications that the record is not one of a sequence of records stored together on long-term storage means. If none of these indicators is found during the "retrieval" of a given record from long-term storage to a host computer, the succeeding record(s) are then cached. Upon the receipt of each successive "read request" from the host computer, the request is compared with a directory which keeps track of which records have been cached so that the host's request will be satisfied from the cache if possible. In a particularly preferred embodiment, if a first record on a given disk track is read from the disk storage device into the host and no indicator that the first record is not part of a sequence of records on the given track is detected, then the remainder of the data on the given track is then cached. If the data on the rest of the given track is then called for by the host computer, the track next succeeding the given track is then cached, again without host intervention, and so on.

BRIEF DESCRIPTION OF THE DRAWINGS

The invention will be better understood if reference is made to the accompanying drawings, in which.

DESCRIPTION OF THE PREFERRED EMBODIMENTS

As described above, the method of detection of a sequential data stream of the invention was designed in particular to operate within the cache memory buffered subsystem which is the subject of copending application Ser. No. 325,346 filed Nov. 27, 1981. The chief objective of the cache memory buffered system which is the subject of the copending application referred to above and of which the present invention forms a part is to save on latency time required to complete a "SEEK" instruction given by the host computer by reading data into a faster access, typically solid-state, memory from a slower access, long-term magnetic storage device, in advance of the host actually calling for the data. In this way, if the cached record is then called for, a physical delay need not be undergone. Clearly, it is desirable that only those records which, in fact, are portions of sequentially accessed sequences of records be staged to the solid-state memory or "cached". Otherwise, caching of data will have beneficial effects only when substantially all the records sought for are, in fact, sequential, e.g., on the order of 90%. This is not the case in typical commercial systems. Accordingly, it is required that some means be provided to detect which records are portions of sequences of records and to cache only those. The present invention relates to means for making the determination.

Figure 1:
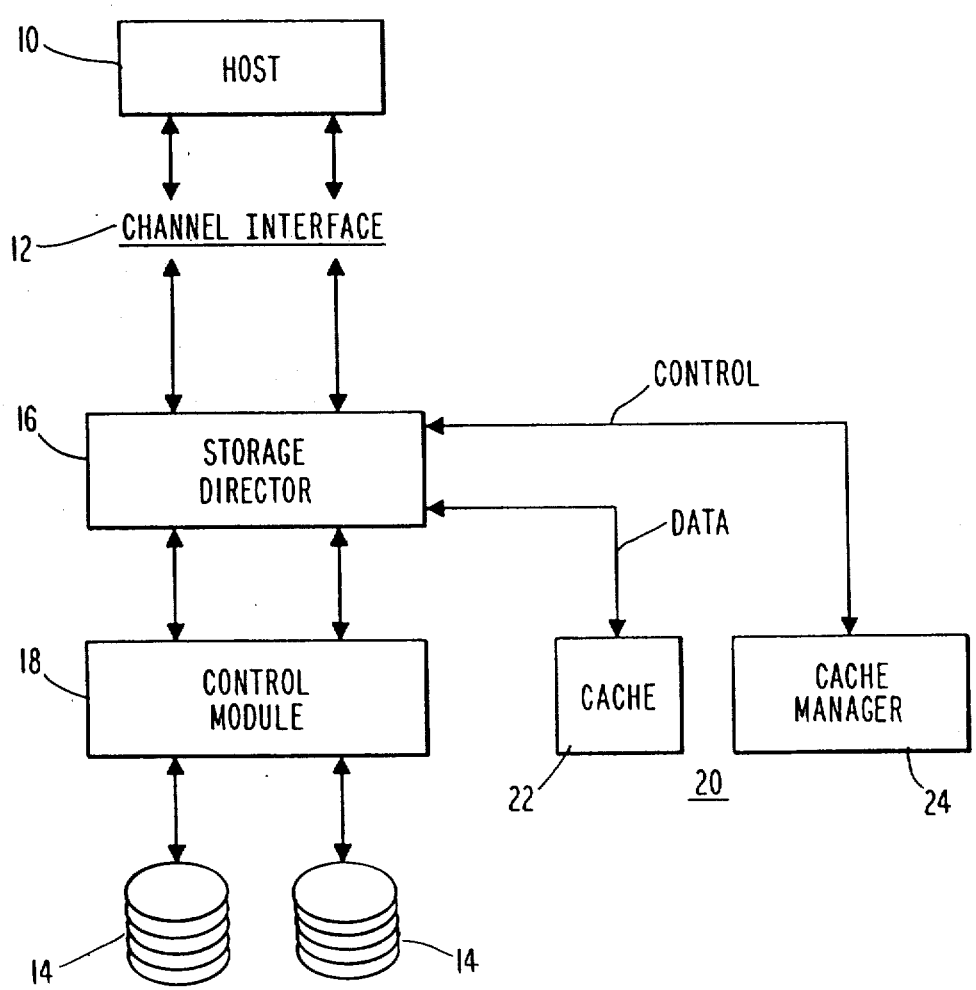
FIG. 1 represents a simplified view of the system within which the invention forms a part.

As also discussed above, the invention is designed to operate in a cache buffered memory subsystem operating as a add-on to a pre-existing memory system which is plug-compatible with a host computer, in a preferred embodiment with an IBM 370 Series machine operating under a typical IBM operating system. The broad layout of the system of the copending application referred to above is shown in FIG. 1. There, the host computer 10 passes commands and data over and receives data from a channel interface indicated generally at 12. In the event that the data to be accessed is stored on a disk drive such as at 14, access commands are passed to a storage director 16 which converts it into a form suitable for controlling a control module 18 which actually controls the movement of the disk drives 14, e.g., the radial movement of the read/write heads with respect to the disks and the like. The system as thus far described is conventional. What is added by the invention of the copending application referred to above is a cache memory subsystem indicated generally at 20 comprising a solid-state cache memory 22 and a cache manager 24 for determining which data is to be staged into the cache memory 22 from the disks 14. It is accordingly the cache manager 24 which carries out the method of the present invention, which will now be described in detail.

When the host computer 10 seeks to obtain data from a disk storage system 14, it issues a well defined "SEEK" command over the channel 12, which is acted upon by the storage director to cause the control module 18 to access the data sought for. The data is then passed back through the control module 18 and the storage director 16 and over the channel interface 12 to the host 10. The actual reading and writing of data is performed under a channel program also defined by IBM, as is the channel interface itself, in a document entitled "I/O Interface Channel to Control Unit", IBM Publication GA22-6974-4. As will be appreciated by those skilled in the art, this well defined protocol permits the data itself to contain additional instructions for further data reading and writing. For example, if a given data set is stored at several different locations on disk, for example, on several different "cylinders", these being areas of data storage spaced at varying distances from the central axis of the disk stack, a "CYLINDER SEEK" command may be encountered during the reading of data. The control module and storage director then cause the head to access the new cylinder sought for and to continue the reading operation. Similar instructions include head seek commands. Thus, typically in the prior art the storage director will follow such "embedded" commands in addition to those received from the host. Similarly, the channel program processed by the storage director itself may contain such commands. Inasmuch as the system of the present invention is desirably "software transparent" to the host, i.e., requires no modification thereto, it continues to obey these instructions. However, it additionally comprises means for examining the data as it is read from the disks to the host, and the channel program's performance, for determining whether additional data should be staged from the disk to the cache after completion of the actual operation ordered by the host. Specifically, the cache manager 24 examines the data as it passes through the storage director 16 for commands such as those above. If it receives no indications that the data is not of sequential nature—these being defined more fully below— it then continues with the reading of all the data stored on a given track (i.e., an area of data storage on a single surface of a disk one full revolution long) into the cache. If the host then calls for the remainder of the track, the cache manager detects this and causes the next track to be similarly staged to the cache without host intervention, and so on. In this connection, note that the "next track" may not be physically adjacent to the last on the same disk surface. Depending on the organization of the disk system, the "next track" may be on an entirely different disk surface, though usually one located above or below the last in a stack of disks, so as to save on both seek and latency delay times.

Accordingly, examination of the data read to the host is conducted throughout the reading, while the actual decision as to whether the following track should be staged is made at completion of the request; that is, at the end of performance of the conventional "channel program". The present invention therefore relates to additional decision-making carried out independent of the host by the cache controller 24. Specifically, the storage director 16 reports to the cache controller or manager 24 certain information or "statistics" which enable the cache manager 24 to make decisions concerning the desirability of staging successive tracks. In a presently preferred embodiment, these statistics may include:

1. Was the first record on the track among the records processed?
2. Was the last record on the track among the records processed?
3. Was the end of file record among the records processed?
4. Was the channel program processed against the cache or direct to the disk storage device?
5. Were there cache or disk read errors encountered?
6. Was an embedded head or cylinder seek command encountered in the channel program?
7. Did a write command occur during the channel program?
8. How many records were processed in the track during the channel program? and
9. How long were the records processed?

As discussed above there are two basic types of decisions relating to stagings to be made following execution of the channel program. First, if the channel program was processed directly from the storage director to the disk drive, i.e., a non-cached record was read, the question as to whether the remainder of the track should be staged into the cache arises. Future accesses would then be directed to the cache; that is, subsequent SEEKs are considered by the cache manager to see whether the record sought for by the host has previously been cached. The second question arises when the channel program was processed to the cache, that is, the data sought for by the channel program was found in the cache, and concerns whether it is desirable to "prestage" the entire next disk track into the cache. Of the above statistics, the following disqualify data from being cached: errors, write commands, embedded seek commands, or "End of File" records. These are all counterindicators of the desirability of caching, as they indicate that the next record on the disk is not necessarily part of the same program as that read.

Figure 2:
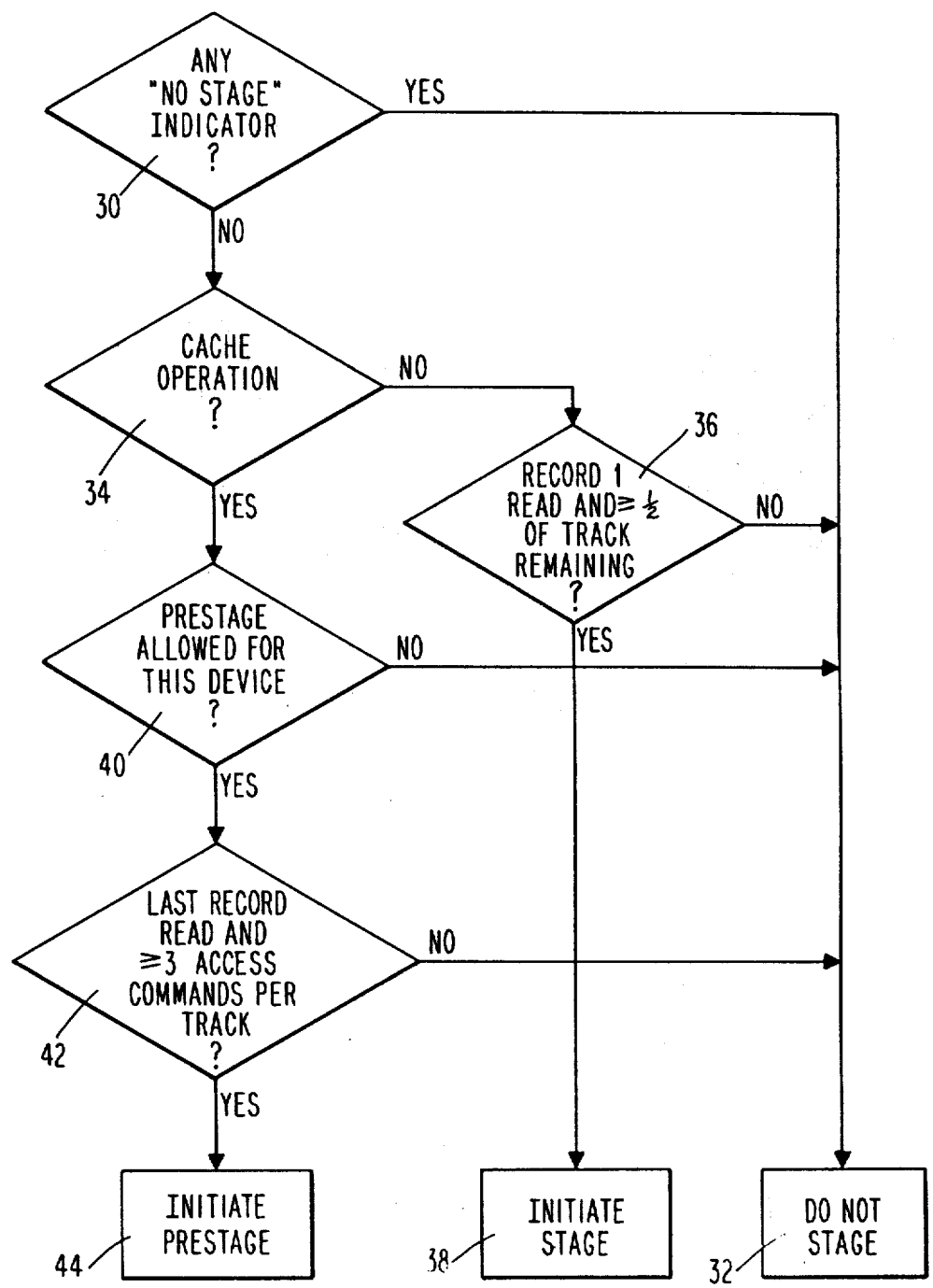
FIG. 2 represents a flowchart of the decision making process according to the invention.

FIG. 2 shows the decision making process in the form of a flowchart. The process shown would be undergone at the completion of each read operation. The examination of the statistics kept by the director to determine whether any of the statistics disqualify the record from staging is performed first, as indicated at block 30 where "no stage" indicators are looked for. If there are such indicators the data is not staged as noted at 32. If there are no such indicators, the next question is whether the previous access was directly from the disk to the host or whether the operation was from the cache to the host, as indicated at decision block 34. If the operation was from disk to host ("NO" answer to block 34) the data is then looked at to see whether both the first record on the track was read and that more than one-half of the track remains to be read, as shown at 36. If both these conditions are true then the remainder of the track is staged, as noted at 38. Parenthetically, the reason why whether more than ½ of the track remains is considered is simply to insure that it is worthwhile to do the staging (i.e., read the remainder of the track into the cache) at this particular point. Returning to consideration of block 34, if the previous operation was from the cache to the host, then the question is whether prestage of the next track is desirable. At decision block 40 the question is whether prestage is allowed for records stored on a particular disk device. This allows the system designer to prevent the data stored on certain disk devices from being cached, i.e., allows him to save certain disks for data he knows will be random. For example, so-called "fixed head disks" which typically have less latency time than movable head disk drives would ordinarily not be used for sequential data sets. If prestage is not allowed, then the decision is made simply not to stage. If prestage is permitted, the cache manager 24 (FIG. 1) then determines if prestage is desirable. For example, the decision might consider whether both the last record of the track was read and whether there were at least 3 access commands to the track as noted at 42. Both these conditions are to be satisifed before prestaging is accomplished. If so, prestage is undergone, at 44, by reading the next track into the cache. If the last record of the track has not been read, clearly prestaging is inappropriate. Even if this condition is fulfilled, if there were less than three access commands per track, the records are evidently quite long and prestaging is not required to reduce operating time lost to latency to a workable minimum. Similarly, the manager might look at the length of the record requested in a given request, and stage more than the remainder of the track, or more than a single following track, if it appears that one or more subsequent similar requests will not otherwise be satisfied by the data staged to the cache.

The flowchart above will be appreciated by those skilled in the art as one designed to operate as a subprogram within a cache manager control program. In particular, the method of the invention as described above is designed to operate within the Model 8880 disk controller available from Storage Technology Corporation, the assignee of the present invention. Indeed, the present invention together with that described in the copending application referred to and incorporated by reference above, is field installable in this disk drive controller in a reasonable time and at relatively modest cost. Accordingly, the decision-making sequence shown in FIG. 2 is configured as a subprogram undergone every time a channel program is executed. There are numerous other ways in which it would be possible to implement the method of the invention. For example, staging could only be considered where the record most recently read began a track and prestaging could only be considered at the end of a track. Those skilled in the art will recognize that numerous other expedients are possible.

In a presently preferred embodiment, the decision-making capacity of the invention is embodied in microcode permanently written on a floppy disk physically carried within the storage director container and written to solid-state random-access memory each time the director is turned on. This is operatively connected to a preexisting storage director processor for performing the cache manager function. Use of, e.g., a Zilog Z8000 microprocessor is envisioned as a possible substitute in an updated director, although again those skilled in the art will recognize that there are numerous alternatives.

Attached hereto as Appendix A and incorporated herein by reference is a complete "pseudocode" rendition of the method of the invention. This pseudocode includes both actual microcode instructions and documentary notes so as to enable one other than the original programmer to understand the program. Appendix A describes a microcode module entitled "End-Channel Program Processing". It begins with a general description of the program function, and with operational descriptions including the bits which are required from the storage director for its operation, definition of the various subroutines and of the various registers required. The bulk of the program begins at line 01770 (page 2.163) and comprises actual microcode instructions as at lines 02730 through 02840 preceded by English language explanatory matter describing subject matter of the decision made by the following microcode, e.g., as at lines 02630 through 02720. The decision blocks shown in FIG. 2 are contained in modules of the microcode of Appendix 1. For example, the stage determination decision-making flowchart which is described above in connection with FIG. 2 runs from pages 2.169 through 2.176 of Appendix 1. Of this, for example, the decision represented by box 30 in FIG. 2 is shown in English language form at lines 02060 through 02150 and in microcode at lines 02160 through 02390.

The remainder of the microcode and functional description attached will be of use in understanding of various other functions of the cache manager, for example, deallocation of inactive frames is described in a submodule following that referring to the stage determination just discussed. "Deallocation" refers to the process whereby areas of the solid-state memory of the cache are selected for reuse, i.e., it is determined by this sub-module that the data stored in a portion of the cache will no longer be sought by the host. For example, upon the host's writing to an area on a disk, the contents of which were previously cached, the data stored in the cache is clearly no longer valid and hence that area of the cache is deallocated and returned to the pool of vacant storage locations, to which the cache manager may elect to assign data to be staged.

Those skilled in the art given the thus incorporated documentation of the End-Channel Program would have no difficulty in practicing the process of the invention.

Other copending applications which may be of relevance in understanding the present invention are incorporated herein by reference, including copending Ser. No. 325,351 filed Nov. 27, 1981 which discusses the organization of the memory space comprised in the solid-state cache memory 22. Error management and recovery functions performed by the cache manager are discussed in copending Ser. No. 325,287 filed Nov. 27, 1981 incorporated herein by reference. Also relevant is copending application Ser. No. 325,288 filed Nov. 27, 1981 incorporated herein by reference which discusses how precise correspondence between storage locations on the disk devices and the cache is maintained.

Those skilled in the art will recognize that there has been described a method for determining the sequential nature of a disk record which satisfies the needs of the art and objects of the invention discussed above. Moreover, it will be recognized that there are numerous ways in which the method of the invention can be embodied and improved upon and that therefore the above disclosure should not be considered as a limitation on the invention but merely as exemplary thereof. The invention is more properly defined by the following claims.

APPENDIX A

DESCRIPTION:

The END CHANNEL PROGRAM command provides the Cache Manager with a summary of the events occurring during the Channel Program. Information regarding errors from either the Cache or the DASD as well as access monitoring statistics is included. Additional flags are included which indicate the following: the operation started on the Cache, the operation started on DASD, an imbedded seek was encountered, a track switching operation occurred, or a write operation occurred.

The DASD operation flag indicates that the Cache Director, following the DIRECTORY SEARCH command, started the track field transfers on DASD versus on the Cache.

Whenever an imbedded cylinder seek (DASD seek or cylinder seek commands) is encountered, the END CHANNEL PROGRAM command is issued immediately with the imbedded cylinder seek flag set. All statistics and last seek information is updated immediately and the frame in the Cache Directory is invalidated.

If the write flag is set and the processing was to the Cache (ie. not 'DASD OPERATION'), the frame corresponding to DID.C.C.H is invalidated.

When the track switch flag is set along with the write flag, the Cache Manager invalidates any frame containing a track with an address between the original address that was used for the directory search, and the address currently given (last seek address) in the END CHANNEL PROGRAM command. Thus any track that the write could have occurred to is invalidated and integrity is preserved.

The Update Seek Only flag is indicated when a channel program is received which contains only control commands (not reads/searches). The Recalibrate command is an example of a control command. The Cache Manager updates the last seek address stored in the Cache Manager.

DASD read error is returned in the case of No Record Found, Data Check, or Track Overrun conditions. The frame in the Cache Directory is invalidated.

If Cache read checks are indicated, the Cache Manager marks the indicated frame unusable in the Cache Directory.

If the Cache Manager determines that it would be profitable to stage this track, based on access monitoring and customer indications, it returns 'READ STAGE PARMS' status which causes the STAGE operation to be initiated.

END CHANNEL PROGRAM

| TAG BUS | X'0F' (EXTENDED) | | | | |
|---|---|---|---|---|---|
| BUS OUT Bit 0<br>1<br>2<br>3<br>4<br>5<br>6<br>7 | 0 END CHANNEL<br>0 PROGRAM<br>1 (2)<br>0<br>1<br>0 RESIDUAL COUNT (11)<br>1<br>1 | | | TRANSFER COUNT (11) | |
| PARMS (BUS OUT) | BYTE 0 | BYTE 1 | BYTE 2 | BYTE 3 | BYTE 4 |
| | FLAGS | FLAGS | DEVICE ID | CYL HIGH | CYL LOW |
| Bit 0<br>1<br>2<br>3<br>4<br>5<br>6<br>7 | DASD RD ERR<br>0<br>CACHE RD ERR<br>IMBED CYL SK<br>TRACK SWITCH<br>WRITE OCCURD<br>IMBED HD SK<br>CHL-I RESET | FIRST RCD<br>LAST RCD<br>EOF RECORD<br>UPDT SK ONL<br>DASD OPERTN<br>0<br>0<br>0 | 0<br>0<br>DID<br>DID<br>DID<br>DID<br>DID<br>DID | C<br>C<br>C<br>C<br>C<br>C<br>C<br>C | C<br>C<br>C<br>C<br>C<br>C<br>C<br>C |
| PARMS (BUS OUT) | BYTE 5 | BYTE 6 | BYTES 7-9 | | BYTE 10 |
| | HEAD | # RCDS READ | RCD LENGTH / ERR ADDR | | LRC BYTE |
| Bit 0<br>1<br>2<br>3<br>4<br>5<br>6<br>7 | H<br>H<br>H<br>H<br>H<br>H<br>H<br>H | #<br>#<br>#<br>#<br>#<br>#<br>#<br># | KL DL DL<br>KL DL DL<br>KL DL DL<br>KL DL DL<br>KL DL DL<br>KL DL DL<br>KL DL DL<br>KL DL DL | | LRC 128<br>LRC 64<br>LRC 32<br>LRC 16<br>LRC 8<br>LRC 4<br>LRC 2<br>ALWAYS 1 |
| BUS IN | TAG VALID | | NORMAL END | | CHECK END |
| Bit 0<br>1<br>2<br>3<br>4<br>5<br>6<br>7 | 0<br>0<br>0<br>0<br>0<br>0<br>0<br>0 | | 0<br>READ STAGE PARMS<br>0<br>0<br>0<br>0<br>MODE CHGE PENDING<br>0 | | INVALID MODIFIER<br>SYNC OUT ERROR<br>INCORRECT LENGTH<br>INVALID PARMS<br>INCORRECT SEQUENCE<br>TABLE ERROR<br>NOT IN CACHE MODE<br>LRC CHECK |

MODULE: END CHANNEL PROGRAM PROCESSING 2.4.5 END CHANNEL PROGRAM PROCESSING

```
***************** START OF SPECIFICATIONS *********************  00020
*                                                              *  00030
*                                                              *  00040
*  MODULE NAME: MDFGDD01                                       *  00050
*                                                              *  00060
*  MODULE TITLE: End Channel Program Processing                *  00070
*                                                              *  00080
*  MODULE OWNER: Rick Coulson
```

FUNCTIONAL DESCRIPTION

This module performs the following End Channel Program functions:

- Store last seek address
- Update statistics
- Release frame
- Deallocation if required
- Frame invalidation if required
- Stage decision
- Prestage decision
- Set up parameters for Read Stage Parameters command
- Return 'read stage parameters' status if staging indicated End Channel Program contains three routines; Statistics Keeping, Deallocation Determination and Stage Determination. Statistics are kept to monitor algorithm effectiveness. Deallocation occurs as a result of read errors, writes, and reading the last record on a track (the track is no longer needed). Stages or prestages are initiated if the proper conditions are met (described in the Stage Decision segment).

The input to End Channel Program is the Receive buffer. The return flag byte and the return code indicate errors and whether or not a Read Stage Parameters command is allowed.

OPERATIONAL DESCRIPTION

End Channel Program first calls the Update Last Seek service module. Then the Update Statistics routine is called to perform the statistics keeping portion of End Channel Program. Next the Release Frame service module is called to release the frame. Then the Deallocation determination routine does any necessary deallocation. Finally the Stage Determination routine is used to make any stage initiating determinations.

The following bits from the flag bytes drive the End Channel Program processing:

DASD RD ERROR -- The 'DASD read error' flag is used by Stage Determination. If a DASD read error is indicated, a stage will not result.

CACHE RD ERROR -- The 'cache read error' flag is used by the Deallocation segment. If a cache read error occurs, the frame is permanently invalidated.

IMBEDDED CYLINDER SEEK -- The 'imbedded cylinder seek' flag is used by the Stage Determination segment and the Deallocation module. If an imbedded seek has occurred, the frame is deallocated and no stage or prestage is initiated.

WRITE OCCURRED -- The 'write occurred' flag is used by Statistic keeping, Deallocation and Stage determination. If a write occurred, the frame is deallocated and no stage or prestage is initiated.

TRACK SWITCH -- The 'track switch' flag is used by Deallocation and Stage determination. If a track switch occurred along with a write, a series of frames are deallocated. A stage never follows a track switch.

DASD OPERATION -- The 'DASD operation' flag is used by Stage determination to determine whether to consider staging or prestaging. It is also used by Deallocation to determine if certain 'frame not found' conditions constitute a table error.

UPD SEEK ONLY -- The 'update seek only' flag indicates that only the last seek address is to be updated. If set, End Channel Program does not call Update statistics, Deallocate, or Stage determination.

| | | | |
|---|---|---|---|
| EOF RECORD — | The 'EOF record' flag indicates that the end of a data set has been reached. Stage determination does not cause a stage or prestage if this flag is set. | | |
| FIRST RECORD — | The 'first record' flag is used by Stage determination. If set, Stage determination assumes that the operation was sequential, and thus the frame is a candidate for staging. | | |
| LAST RECORD — | The 'last record' flag is used by Stage determination. If set, the next track may be prestaged. | | |
| IMBEDDED HEAD SEEK — | The 'head seek' flag is used to indicate that head switching occurred and that the entire cylinder must be invalidated if the 'write' flag was on. | | |
| CHANNEL INTERFACE RESET — | The 'channel interface reset' flag indicates that a director reset or a halt I/O occurred. Proper recovery action (deallocation of (cylinder) must take place. | | |

SPECIAL CONSIDERATIONS
---- --- -- -------------
none

| INTERFACE ITEM | NAME | DESCRIPTION/PARAMETERS | |
|---|---|---|---|
| ENTRY POINT(S): | MDFGDD01 | ENTRY PARAMETERS — Receive buffer | |
| | | DID | RCV_DIDC |
| | | FLAG BYTE 1 | RCV_FLAG |
| | | FLAG BYTE 2 | RCV_FLAG |
| | | C (HI) | RCV_DIDC |
| | | C (LO) | RCV_CYLH |
| | | H | RCV_CYLH |
| | | NUMBER OF RECORDS | RCV_RCKL |
| | | RCRD LEN/ERR ADD 1 | RCV_ERRD |
| | | RCRD LEN/ERR ADD 2 | RCV_ERRA |
| | | RCRD LEN/ERR ADD 3 | RCV_ERRA |
| NORMAL EXIT(S): | caller | RETURN REGISTER GROUP (RTN) | |
| | | RETURN FLAG — RETFLAG | |
| | | Bit 0=0 --> Normal End | |
| | | =1 --> Check End | |
| | | Bit 1=1 --> Send Data | |
| | | RETURN CODE — RETCODE | |
| | | Normal End | |
| | | Read Stage Parms NE_RDSTG | |
| | | Check End | |
| ERROR EXIT(S): | none | | |
| ROUTINES USED: | MDFGDAS3 | Release Frame | |
| | MDFGDSB1 | Store Last Seek | |
| | MDFGDSA9 | Deallocate Range | |
| | MDFGDSB2 | Get Last Seek | |
| | MDFGDSA5 | Perm Deallocate Frame | |
| | MDFGDDS2 | Update Statistics | |
| | MDFGDDS3 | Deallocation Determination | |
| | MDFGDDS4 | Stage Determination | |
| | MDFGDSD2 | Take Statistics | |
| MACROS USED: | USAVE | Save the IRG | |
| | UCALLMOD | Call A Module | |
| | USETIRG | Change the IRG | |
| | URESTORE | Restore the IRG | |
| | URETURN | Return to Caller | |
| DATA STRUCTURES: | MDDGDT09 | R/R Space Management Status (SST) | |
| | MDDGDT04 | R/W DID Status Table (DST) | |
| | MDDGAT01 | R/W Cache Manager Status (CST) | |
| INTERNAL REGS: | > | >(R/W) > | |
| EXTERNAL REGS: | IRG | W Register Group Pointer | |
| ENTRY IRG: | P(EX STK) | EXIT IRG: P(EX STK) | |
| | S(PL1) | S(RTN) | |

```
*                                                                  *  01600
*   CHANGE ACTIVITY                                                *  01610
*   ---------------                                                *  01620
*    01/09/81          START                                       *  01620
*    02/10/81          D2 SCHEDULED (prolog)                       *  01630
*    02/10/81          D2 COMPLETED                                *  01640
*    03/25/81          I1 SCHEDULED (pseudo code)                  *  01650
*    03/25/81          I1 COMPLETED                                *  01660
*    04/06/81          Changes as a result of new prolog format and review *  01670
*    04/16/81          Changes as a result of new interface definition    *  01680
*    07/15/81          REAL CODE STARTED                           *  01690
*    07/23/81          I2 SCHEDULED (real code)                    *  01700
*    07/24/81          I2 COMPLETED (MODULE SIZE = ??? words)      *  01710
*    >(m/d/y)  >(by)  >(change #) >(change description)            *  01720
*                                                                  *  01730
*************************  END OF SPECIFICATIONS  *****************   01740
*                                                                     01750
*------------------------------------------------------------------*
* LOCALS                                                           *  01770
*------------------------------------------------------------------*  01780
                                                                      01790
ACCCOUNT  DEF    P0                      *ACCESS COUNT                01800
XXIRKCYL  DEF    P0P1                    *TRACKS PER CYLINDER         01800
TRKCYL    DEF    P1                                                   01810
ADDRESS   DEF    P2P3                                                 01820
ADDRESSH  DEF    P2                                                   01830
ADDRESSL  DEF    P3                                                   01840
FLAGS     DEF    P6P7                    *FLAG BYTES                  01850
FLAG0     DEF    P6                      *FLAG BYTE 0                 01860
DASDRERR  DEF    0                           *DASD READ ERROR         01870
CACHRERR  DEF    2                           *CACHE READ ERROR        01880
IMBCYLSK  DEF    3                           *IMBEDDED CYLINDER SEEK  01890
TRSWITCH  DEF    4                           *TRACK SWITCH            01900
WRITEOCC  DEF    5                           *WRITE OCCURRED          01910
IMBHDSK   DEF    6                           *IMBEDDED HEAD SEEK      01920
CHANLRES  DEF    7                           *CHANNEL INTERFACE RESET 01930
FLAG1     DEF    P7                      *FLAG BYTE 1                 01940
FIRSTREC  DEF    0                           *FIRST RECORD READ       01950
LASTREC   DEF    1                           *LAST RECORD READ        01960
EOFREC    DEF    2                           *EOF RECORD READ         01970
UPSKONLY  DEF    3                           *UPDATE SEEK ONLY        01980
DASDOPER  DEF    4                           *DASD OPERATION          01990
                                                                      02000
                                                                      02010
*------------------------------------------------------------------*
* ENTRY END CHANNEL PROGRAM PROCESSING                             *  02020
*------------------------------------------------------------------*  02030
          START  MDFGDD01                                             02040
          ORG    MDFGDD01                                             02050
MDFGDD01  USAVE                           *SAVE THE IRG               02060
*------------------------------------------------------------------*  02070
* IF 'channel interface reset' bit not set                         *  02080
*------------------------------------------------------------------*  02090
          ADDRESSH = $RCVBUF                                          02100
          ADDRESSL = :RCV_FLAG            *SET UP ADDRESS OF RCVBUFFER 02110
          FLAGS < (ADDRESS).INC           *GET THE FLAG BYTES         02120
          USETIRG IRG SECD PL2_SECD       *SWITCH TO PL2              02130
          PL2DIDCY < (ADDRESS).INC        *PUT DID.C INTO PASS REGS   02140
          PL2CHD < (ADDRESS)              *PUT C.H INTO PASS REGS     02150
          JL     FLAG0.CHANLRES,THEN      *BRANCH IF NOT ABORTED      02160
          B      ELSE                                                 02170
                                                                      02180
*------------------------------------------------------------------*  02190
*  THEN-DO for not aborted                                         *  02200
*                                                                  *  02210
*    CALL STORE LAST SEEK                                          *  02220
*      PASS: DID.C.C.H                                             *  02230
*      RECEIVE: NOnE                                               *  02240
*------------------------------------------------------------------*  02250
THEN      UCALLMOD MDFGDSB1               *STORE LAST SEEK            02260
                                                                      02270
*------------------------------------------------------------------*  02280
*   IF update seek only bit not set                                *  02290
*                                                                  *  02300
*     THEN-DO for update seek only bit not set                     *  02310
*       CALL  Release Frame                                        *  02320
*         PASS: DID.C.C.H                                          *  02330
*         RECEIVE: Return flags, access count                      *  02340
*                                                                  *  02350
                                                                      02360
```

```
         INCLUDE Update Statistics                              02370
         INCLUDE Deallocation Determination                     02380
         INCLUDE Stage Determination                            02390
                                                                02400
      END-THEN for update seek only bit not set                 02410
*----------------------------------------------------*          02420
         JH    FLAG1.UPSKONLY,ELSE1  *BRANCH IF UPDATE SEEK ONLY 02430
         IRG = SAVEDIRG              *RESTORE TO PL2            02440
         UCALLMOD MDFGDSA3           *RELEASE FRAME             02450
         ACCCOUNT = ACCESSCT         *PERSERVE ACCESS COUNT     02460
         UCALLSEG MDFGDDS2           *UPDATE STATS              02470
         UCALLSEG MDFGDDS4           *DEALLOC DETERMINATION     02480
         UCALLSEG MDFGDDS3           *STAGE DETERMINATION       02490
         B    DONE                                              02500
                                                                02510
*----------------------------------------------------*          02520
*    ELSE-DO update seek only bit set                *          02530
*       Set normal return flag                       *          02540
*       Set zero return code                         *          02550
*    END-ELSE update seek only bit set               *          02560
*  END-THEN for channel program not aborted          *          02570
*----------------------------------------------------*          02580
                                                                02590
ELSE1    RETCODE = X00               *ZERO RETURN CODE          02600
         RETFLAG = NORMEND           *NORMAL END                02610
         B    DONE                                              02620
                                                                02630
*----------------------------------------------------*          02640
*    ELSE-DO for channel program aborted because of check-1 *   02650
*       Get tracks/cylinder for this device type     *          02660
*       CALL Deallocate Range                        *          02670
*          PASS:  DID,C,C,0, tracks/cyl (dealloc cylinder) *    02680
*          RECEIVE: Return flags                     *          02690
*       Set normal end return flag                   *          02700
*       Set zero return code                         *          02710
*    END-ELSE for channel program aborted            *          02720
*----------------------------------------------------*          02730
ELSE     USETIRG IRG SECD SST_SECD   *SWITCH TO SST             02740
         ADDRESSH = $DTD_TABL        *SET UP ADDRESS TO DTD     02750
         JL    SST_DFLG.BITDEVTA,TYPEB  *BRANCH IF DEVICE TYPE B 02760
         XXTRKCYL < (ADDRESSH..:DFHDTRKA) *GET TRACKS/CYL A     02770
         B    CALLIT                                            02780
TYPEB    XXTRKCYL < (ADDRESSH..:DFHDTRKB) *GET TRACKS/CYL B     02790
CALLIT   USETIRG IRG SECD PL2_SECD   *SWITCH TO PL2             02800
         PL2HEAD = X00               *LOWER LIMIT = 0           02810
         PL2HEAD2 = TRKCYL           *UPPER RANGE               02820
         UCALLMOD MDFGDSA8           *DEALLOCATE RANGE          02830
         RETCODE = X00               *ZERO RETURN CODE          02840
         RETFLAG = NORMEND           *NORMAL END RETURN CODE    02850
                                                                02860
*----------------------------------------------------*          02870
* RETURN                                             *          02880
*----------------------------------------------------*          02890
DONE     URESTORE                    *RESTORE THE IRG           02900
         URETURN                     *RETURN TO CALLER          02910
                                                                02920
         END
MODULE: END CHANNEL PROGRAM PROCESSING
SUBMODULE: UPDATE STATISTICS
```

2.4.5.1 SUBMODULE: UPDATE STATISTICS

```
*****************  START OF SPECIFICATIONS  *******************  00020
*                                                            *   00030
*  SUBMODULE NAME:  MDFGDDS2                                 *   00040
*                                                            *   00050
*  SUBMODULE TITLE: UPDATE STATISTICS                        *   00060
*                                                            *   00070
*  PARENT MODULE: MDFGDD01                                   *   00080
```

```
*   FUNCTIONAL DESCRIPTION                                                            *   00090
*   ------------------                                                                *   00100
*   The Update Statistics routine updates the Device Statistics Table.                *   00110
*   One of three event counters is incremented, depending on how the                  *   00120
*   channel program was satisfied. The three counters are:                            *   00130
*                                                                                     *   00140
*                                                                                     *   00150
*   READ CHANNEL PROGRAM SATISFIED THROUGH CACHE -- The channel program               *   00160
*   was satisfied entirely through the cache.                                         *   00170
*                                                                                     *   00180
*   SWITCH TO DASD DUE TO WRITE -- The channel program started out on                 *   00190
*   the cache but was switched to DASD because a write command was                    *   00200
*   received.                                                                         *   00210
*                                                                                     *   00220
*   TARGET TRACK NOT FOUND IN CACHE -- The target track was not in the                *   00230
*   cache so the channel program was satisfied entirely through DASD.                 *   00240
*                                                                                     *   00250
*   NOTE: These statistics are not used by the stage determination                    *   00260
*         process. They are kept to be used in analysis of Chinook                    *   00270
*         performance.                                                                *   00280
*                                                                                     *   00290
*                                                                                     *   00300
*   INTERNAL ITEMS    NAME        DESCRIPTION/PARAMETERS                              *   00310
*   --------------    ----        ---------------------                               *   00320
*   ROUTINES USED:    MDFGDSD2    Take Statistics                                     *   00330
*   MACROS USED:      URETURN     Return                                              *   00340
*                     UCALLMOD    Call Module                                         *   00350
*                     USETIRG     Change the IRG                                      *   00360
*   DATA STRUCTURES:  none                                                            *   00370
*   INTERNAL REGS:    >           >(R/W)  >                                           *   00380
*   EXTERNAL REGS:    IRG         W       REGISTER BANK POINTER                       *   00390
*                                                                                     *   00400
*   ENTRY IRG:        P(Ex Stk)   EXIT IRG:  P(Ex Stk)                                *   00410
*                     S(RTN)                 S(RTN)                                   *   00420
*                                                                                     *   00430
*   CHANGE ACTIVITY                                                                   *   00440
*   ---------------                                                                   *   00450
*   MM/DD/YY          I2 COMPLETED (MODULE SIZE = ??? words)                          *   00460
*                                                                                     *   00470
************************ END OF SPECIFICATIONS *************************              *   00480
*---------------------------------------------------------------------*                    00490
* LOCALS                                                              *                    00500
*---------------------------------------------------------------------*                    00510
ACCCOUNT  DEF    P0                      *ACCESS COUNT                                     00520
ADDRESS   DEF    P2P3                                                                      00530
ADDRESSH  DEF    P2                                                                        00540
ADDRESSL  DEF    P3                                                                        00550
FLAGS     DEF    P6P7                    *FLAG BYTES                                       00560
FLAG0     DEF    P6                      *FLAG BYTE 0                                      00570
DASDRERR  DEF    0                           *DASD READ ERROR                              00580
CACHRERR  DEF    2                           *CACHE READ ERROR                             00590
IMBCYLSK  DEF    3                           *IMBEDDED CYLINDER SEEK                       00600
TRSWITCH  DEF    4                           *TRACK SWITCH                                 00610
WRITEOCC  DEF    5                           *WRITE OCCURRED                               00620
IMBHDSK   DEF    6                           *IMBEDDED HEAD SEEK                           00630
CHANLRES  DEF    7                           *CHANNEL INTERFACE RESET                      00640
FLAG1     DEF    P7                      *FLAG BYTE 1                                      00650
FIRSTREC  DEF    0                           *FIRST RECORD READ                            00660
LASTREC   DEF    1                           *LAST RECORD READ                             00670
EOFREC    DEF    2                           *EOF RECORD READ                              00680
UPSKONLY  DEF    3                           *UPDATE SEEK ONLY                             00690
DASDOPER  DEF    4                           *DASD OPERATION                               00700
                                                                                           00710
*---------------------------------------------------------------------*                    00720
* (start of Update Statistics Segment)                                *                    00730
*---------------------------------------------------------------------*                    00740
          START  MDFGDDS2                                                                  00750
          ORG    MDFGDDS2                                                                  00760
MDFGDDS2  ADDRESSH = $SAVEP4P5            *SET UP ADDRESS TO SAVE P4P5                     00770
          ADDRESSL = :SAVEP4P5                                                             00780
          P4P5   > (ADDRESS)              *SAVE P4P5 TO CLEAR REG SPACE                    00790
          USETIRG IRG_SECD PL2_SECD       *SWITCH TO PASS LINK 2                           00800
                                                                                           00810
*---------------------------------------------------------------------*                    00820
* IF DASD operation not set                                           *                    00830
*---------------------------------------------------------------------*                    00840
                                                                                           00850
```

```
         JH      FLAG1.DASDOPER.ELSE       *BRANCH IF DASD OPERATION         00860
                                                                             00870
*----------------------------------------------------------------*           00880
*     THEN-DO for cache operation to start with                  *           00890
*        IF 'write occurred' SEt                                 *           00900
*           THEN-DO for switch to DASD                           *           00910
*              CALL Take Statistics                              *           00920
*                 PASS: DID, increment switch to DASD            *           00930
*                 RECEIVE: return flags                          *           00940
*           END-THEN for switch to DASD                          *           00950
*----------------------------------------------------------------*           00960
THEN     JL      FLAG0.WRITEOCC.ELSE2      *BRANCH IF NO WRITES              00970
         PL2STATC = SCODEWFD               *INC WRITE FORCES TO DASD         00980
         UCALLMOD MDFGDSD2                 *CALL TAKE STATISTICS MODULE      00990
         B       DONE                                                        01000
                                                                             01010
*----------------------------------------------------------------*           01020
*           ELSE-DO for hit                                      *           01030
*              CALL Take Statistics                              *           01040
*                 PASS: DID, increment read satisfied through cache *        01050
*                 RECEIVE: return flags                          *           01060
*           END-ELSE for hit                                     *           01070
*     END-THEN for cache operation                               *           01080
*----------------------------------------------------------------*           01090
ELSE2    PL2STATC = SCODERTC               *INC READ SATISFIED THRO CACHE    01100
         UCALLMOD MDFGDSD2                 *TAKE STATISTICS                  01110
         B       DONE                                                        01120
                                                                             01130
*----------------------------------------------------------------*           01140
*     ELSE-DO for DASD operation                                 *           01150
*        CALL Take Statistics                                    *           01160
*           PASS: DID, increment target track not in cache       *           01170
*           RECEIVE: return flags                                *           01180
*     END-ELSE for DASD operation                                *           01190
*----------------------------------------------------------------*           01200
ELSE     PL2STATC = SCODETNC               *INC TARGET TRACK NOT IN CACHE    01210
         UCALLMOD MDFGDSD2                 *TAKE STATISTICS                  01220
                                                                             01230
*----------------------------------------------------------------*           01240
* (end of segment)                                               *           01250
*----------------------------------------------------------------*           01260
DONE     ADDRESSH = $SAVEP4P5                                                01270
         ADDRESSL = :SAVEP4P5                                                01280
         P4P5 < (ADDRESS)                  *RESTORE P4P5                     01290
         URETURN                           *RETURN TO CALLER                 01300
                                                                             01310
SAVEP4P5 DC      0                                                           01320
         END                                                                 01330
MODULE: END CHANNEL PROGRAM PROCESSING
SUBMODULE: STAGE DETERMINATION
```

2.4.5.2 SUBMODULE: STAGE DETERMINATION
---------------------------------------

```
****************** START OF SPECIFICATIONS ********************              00020
*                                                               *            00030
*  SUBMODULE NAME: MDFGDDS3                                     *            00040
*                                                               *            00050
*  SUBMODULE TITLE: STAGE DETERMINATION                         *            00060
*                                                               *            00070
*  PARENT MODULE: MDFGDD01                                      *            00080
*                                                               *            00090
*  FUNCTIONAL DESCRIPTION                                       *            00100
*  ----------------------                                       *            00110
*  The Stage Determination routine is responsible for the decision *         00120
*  on whether or not to stage a track, based on information     *            00130
*  contained in the End Channel Program command. The module must *           00140
*  decide whether or not to Stage the track if the channel program *         00150
*  was executed on DASD, or whether or not to prestage the next *            00160
*  track if it was executed on the Cache.                       *            00170
*                                                               *            00180
*  The following tasks are included in Stage Determination:     *            00190
*                                                               *            00200
*  - Check for no read errors                                   *            00210
```

```
- Check for no writes in channel program
- Check for no imbedded cylinder seeks/track switch/imbed head seek
- Check for no EOF indication
- Check for don't cache fixed head flag and fixed head cylinder
- Check for record one and >= 3/4 of track remaining unread as well
    as on DASD for stage
- Check for prestage indications
- Set up parameters for read stage parameters command
- Set 'read stage parameters data' valid flag
- Set 'prestage' flag if prestaging indicated
- Return stage/prestage/no stage indication

OPERATIONAL DESCRIPTION
-----------------------

The following algorithm is used in Stage Determination: First
the End Channel Program command is checked for any no staging
indicators which are: 'writes occurred', 'imbedded cylinder seek'
'track switch', 'EOF seen', 'cache read error', 'DASD read
error', or 'imbedded head seek'. Any of these indications
prevent staging. Also, if the track indicated is a fixed head track
and "don't cache fixed heads" was indicated for this device at
configuration time, no staging will occur.
Next, if the channel program was executed on
the Cache, a prestaging decision must be made. The decision to
prestage is made only if the last record on the track was read,
prestaging is allowed on this DID, and at least three accesses
to the current track were made.
If the channel program executed on DASD, then the decision to
stage must be made. If the first record on the track was read,
and at least three-forths of the track still remains, then the
decision to stage is made. (see the diagram on next page)
```

```
              .*.
           .*     *.
          .* Any 'no *.   yes
          *. staging  .* ----------------------+
           *.indicator?*                        |
             *.     .*                          |
               *. .*                            |
                 *                              |
                 | no                           |
                 |                              |
               .*.                              |
            .*     *.                           |
           .* Cache  *.  no                     |
           *. operation? .* ----------+         |
            *.         .*             |         |
              *.     .*               |         |
                *. .*                 |         |
                  *                   |         |
                  | yes             .*.         |
                  |              .*     *.      |
                  |             .* Record 1 *.  no
                  |             *. read and >=3/4.* -------->+
                  |              *. remain  .*                |
                  |                *.     .*                  |
                  |                  *. .*                    |
                  |                    *                      |
                  |                    | yes                  |
                .*.                    |                      |
             .*     *.                 |                      |
            .* Prestage *.  no         |                      |
            *. allowed this .* --------|--------------------->+
             *. DID?    .*             |                      |
              *.     .*                |                      |
                *. .*                  |                      |
                  *                    |                      |
                  | yes                |                      |
                .*.                    |                      |
             .*Last *.                 |                      |
            .*record read*.  no        |                      |
            *. and >= 3    .* ---------|--------------------->+
             *. accesses .*            |                      |
              *.     .*                |                      |
                *. .*                  |                      |
                  *                    |                      |
                  | yes                |                      |
        +---------+---+        +-------+-----+        +-------+-----+
        |  Initiate   |        |  Initiate   |        |     No      |
        |  Prestage   |        |    Stage    |        |   Staging   |
        +-------------+        +-------------+        +-------------+
```

```
*
*       SPECIAL CONSIDERATIONS
*       ------- --------------
*       Timing:             The End Channel Program tag is processed while
*                           the Cache Director is maintaining selection to
*                           the device. The processing should take a min-
*                           imum of time, as a Stage operation will begin
*                           with the first possible record.
*
*       Flexibility:        Since this module is key to the performance of
*                           CHINOOK, it is expected that its algorithms
*                           will be tuned to achieve maximum performance.
*                           Thus the module should be constructed in such
*                           a way as to be flexible and easy to change.
*
*       INTERNAL ITEMS      NAME            DESCRIPTION/PARAMETERS
*       -------- -----      ----            ----------------------
*       ROUTINES USED:      None
*       MACROS USED:        URETURN         Return
*                           USETIRG         Change the IRG
*       DATA STRUCTURES:    MDDGDT02     R      Device Type Descriptor (DTD)
*                           MDDGDT09     W      Space Status Table (SST)
*       INTERNAL REGS:      >            >(R/W) >
*       EXTERNAL REGS:      IRG          W      Register Group Pointer
*
*       ENTRY IRG:   P(Ex Stk)    EXIT IRG:  P(Ex Stk)
*                    S(varies)               S(varies)
*
*       CHANGE ACTIVITY
*       ------ --------
*       MM/DD/YY            12 COMPLETED (MODULE SIZE = ??? words)
*
************************** END OF SPECIFICATIONS *****************************
*----------------------------------------------------------------------------*
* LOCALS
*----------------------------------------------------------------------------*
ACCCOUNT  DEF   P0                    *ACCESS COUNT
LOCFLAGS  DEF   P1                    *LOCAL FLAGS
LPRESTAG  DEF   0                     *LOCAL PRESTAGE FLAG
SETLPRES  DEF   X80                   *SET
RESLPRES  DEF   X7F                   *RESET
TRACKUSD  DEF   P0P1                  *TRACK BYTES USED COUNT
TRACKUH   DEF   P0
TRACKUL   DEF   P1
ADDRESS   DEF   P2P3
ADDRESSH  DEF   P2
ADDRESSL  DEF   P3
FIXEDXX   DEF   P2P3                  *NUMBER OF FIXED HEADS
FIXED     DEF   P2
RECPROKL  DEF   P2P3                  *NUMBER OF RECORDS / KEY LENGTH
RECPROC   DEF   P2                    *NUMBER OF RECORDS PROCESSED
KEYLEN    DEF   P3                    *KEY LENGTH
CYLSDEV   DEF   P2P3                  *CYLINDERS PER DEVICE
CYLSDEVH  DEF   P2
CYLSDEVL  DEF   P3
TPL2CYLH  DEF   P6                    *TEMPORARY COPY OF CYL ADDR HI
TPL2CYLL  DEF   P7                    *TEMPORARY COPY OF CYL ADDR LO
ALTADDR   DEF   P6P7                  *ALTERNATE ADDRESS
ALTADDRH  DEF   P6
ALTADDRL  DEF   P7
RECLEN    DEF   P6P7                  *RECORD LENGTH
RECLENH   DEF   P6
RECLENL   DEF   P7
STGTHOLD  DEF   P6P7                  *STAGE THRESHOLD
STGTHLDH  DEF   P6
STGTHLDL  DEF   P7
XXTRKCYL  DEF   P6P7                  *TRACKS PER CYLINDER
TRKCYL    DEF   P7
FLAGS     DEF   P6P7                  *FLAG BYTES
FLAG0     DEF   P6                    *FLAG BYTE 0
DASDRERR  DEF   0                       *DASD READ ERROR
CACHRERR  DEF   2                       *CACHE READ ERROR
IMBCYLSK  DEF   3                       *IMBEDDED CYLINDER SEEK
TRSWITCH  DEF   4                       *TRACK SWITCH
WRITEOCC  DEF   5                       *WRITE OCCURRED
IMBHDSK   DEF   6                       *IMBEDDED HEAD SEEK
```

```
CHANLRES DEF    7                               *CHANNEL INTERFACE RESET        01810
FLAG1    DEF    P7                              *FLAG BYTE 1                    01820
FIRSTREC DEF    0                                *FIRST RECORD READ             01830
LASTREC  DEF    1                                *LAST RECORD READ              01840
EOFREC   DEF    2                                *EOF RECORD READ               01850
UPSKONLY DEF    3                                *UPDATE SEEK ONLY              01860
DASDOPER DEF    4                                *DASD OPERATION                01870
                                                                                01880
*------------------------------------------------------------------------------*01890
* (start of Stage Determination segment)                                       *01900
*------------------------------------------------------------------------------*01910
         START  MDFGDDS3                                                        01920
         ORG    MDFGDDS3                                                        01930
                                                                                01940
*------------------------------------------------------------------------------*01950
* Set normal return flag                         WATCH FIXED HEAD!!!!!!!!!!!   *01960
* Set zero return code (00)                                                    *01970
* Reset 'prestage' flag off (SST)                                              *01980
*------------------------------------------------------------------------------*01990
MDFGDDS3 USETIRG IRG_SECD RTN_SECD              *SWITCH TO RETURN REGS          02000
         RETFLAG = NORMEND                      *SET NORMAL END                 02010
         RETCODE = NE NORM                      *SET ZERO RETURN CODE           02020
         USETIRG IRG SECD SST_SECD              *SWITCH TO SST                  02030
         SST FLAG = SST_FLAG . RESPREST         *RESET PRESTAGE FLAG            02040
                                                                                02050
*------------------------------------------------------------------------------*02060
* IF   writes occurred                    or                                   *02070
*      imbedded CYLINDER SEEK             or                                   *02080
*      TRACK SWITCH                       or                                   *02090
*      IMBEDDED HEAD SEEK                 or                                   *02100
*      EOF RECORD                         or                                   *02110
*      cache read error                   or                                   *02120
*      dasd read error                    or                                   *02130
*      (don't cache fixed heads(CST) and C.C < #-of-fixed-head-cyls)           *02140
*------------------------------------------------------------------------------*02150
         D       = FLAG0 TM XBE                 *TEST WRITE OCC,DASD RD ERR,    02160
                                                *CACHE RD ERR, IMBED CYL,HD SK  02170
                                                *TRACK SW                      02180
         BNN     DONE                           *BRANCH IF ANY OF ABOVE SET     02190
         D       = FLAG1 TM X20                 *TEST EOF RECORD                02200
         BNN     DONE                           *BRANCH IF ANY OF ABOVE SET     02210
         JH      SST_DFLG.BITCFXDH,NOT          *BRANCH IF NOT CACHEING FXD HD  02220
B        POSSIBLE                       *BRANCH IF CACHEING FIXED HEADS         02230
NOT      ADDRESSH = SDTD_TABL                   *SET UP ADDRESS FOR DTD         02240
         JH      SST_DFLG.BITDEVTA,TYPEA        *BRANCH IF TYPE A               02250
         ADDRESSL = :DFHDTRKB                                                   02260
         FIXEDXX < (ADDRESS)                    *GET FIXED HEADS DEV B          02270
         B       CONTINUE                                                       02280
TYPEA    ADDRESSL = :DFHDTRKA                                                   02290
         FIXEDXX < (ADDRESS)                    *GET FIXED HEADS DEV A          02300
CONTINUE USETIRG IRG SECD PL2_SECD              *SWITCH TO PASS LINK 2          02310
         TPL2CYLL = PL2CYLL                     *MAKE TEMPORAY COPY             02320
         TPL2CYLH = PL2CYLH                                                     02330
         IRG = SAVEDIRG                         *RESTORE IRG BACK TO SST        02340
         D       = TPL2CYLH CE X00                                              02350
         BNEQ    POSSIBLE                       *BRANCH IF HIGH CYL NOT ZERO    02360
         FIXED = FIXED @ XFF                    *COMPLIMENT                     02370
         FIXED = FIXED + TPL2CYLL               *CARRY MEANS NOT FIXED HEAD     02380
         BNCY    DONE                           *BRANCH IF FIXED HEAD           02390
                                                                                02400
*------------------------------------------------------------------------------*02410
*    THEN null                                                                 *02420
*    ELSE-DO for staging possible                                              *02430
*       IF dasd operation                                                      *02440
*------------------------------------------------------------------------------*02450
POSSIBLE JH      FLAG1.DASDOPER.THEN            *BRANCH IF DASD OPERATION       02460
         B       ELSE                           *OTHERWISE BRANCH TO ELSE       02470
                                                                                02480
*------------------------------------------------------------------------------*02490
*       THEN-DO for dasd operation                                             *02500
*          IF record one read                                                  *02510
*------------------------------------------------------------------------------*02520
THEN     JH      FLAG1.FIRSTREC,THEN2           *BRANCH IF RECORD ONE READ      02530
         B       DONE                                                           02540
                                                                                02550
```

```
*-------------------------------------------------------------------*  02560
*           THEN-DO for record one read                              *  02570
*              Set record length to record length plus key length    *  02580
*              DO-WHILE records-processed not equal 0                *  02590
*                 Set records-processed to records-processed minus 1 *  02600
*                 Set track-used to track-used plus record-length    *  02610
*              END-WHILE records-processed not equal 0               *  02620
*-------------------------------------------------------------------*  02630
THEN2     ADDRESSH = $RCV_RCKL           *SET UP ADDRESS OF # REC READ  02640
          ADDRESSL = :RCV_RCKL                                          02650
          RECPROKL < (ADDRESS)           *GET # RECORDS AND KEY LENGTH  02660
          TRACKUH = X00                  *ZERO TRACK USED COUNT         02670
          TRACKUL = X00                                                 02680
          ALTADDRH = $RCV_DLDL           *SET UP ADDR OF RECORD LENGTH  02690
          ALTADDRL = :RCV_DLDL                                          02700
          RECLEN < (ALTADDR)             *GET RECORD LENGTH             02710
          RECLENL = RECLENL + KEYLEN     *ADD KEY LENGTH TO RECORD LENGT 02720
          RECLENH = RECLENH + X00 + C                                   02730
WHILE     D    = RECPROC CE X00          *BRANCH IF REC PROC = 0        02740
          BEQ  ENDWHILE                                                 02750
          TRACKUL = TRACKUL + RECLENL    *ADD REC LENGTH                02760
          TRACKUH = TRACKUH + RECLENH + C                               02770
          RECPROC = RECPROC + XFF        *DECREMENT RECORDS PROCESSED   02780
          B    WHILE                                                    02790
                                                                        02800
*-------------------------------------------------------------------*  02810
*           Get stage-threshold from Device Type Descriptor table    *  02820
*-------------------------------------------------------------------*  02830
ENDWHILE  ADDRESSH = $DTD_TABL           *SET UP ADDRESS OF DTD         02840
          JH   SST_DFLG.BITDEVTA,TYPEA1  *BRANCH IF DEVICE TYPE A       02850
          ADDRESSL = :DSTGTHB                                           02860
          STGTHOLD < (ADDRESS)           *GET STAGE THRESHOLD DEVICE B  02870
          B    COMPARE                                                  02880
TYPEA1    ADDRESSL = :DSTGTHA                                           02890
          STGTHOLD < (ADDRESS)           *GET STAGE THRESHOLD DEVICE A  02900
                                                                        02910
*-------------------------------------------------------------------*  02920
*           IF track-used less than stage-threshold (< 1/4 read)     *  02930
*              THEN-DO for at least 3/4 of track left unread         *  02940
*                 Set up DID.C.C.H for Read Stage Parameters command *  02950
*                 Set Read Stage Parameters return code              *  02960
*              END-THEN for at least 3/4 of track left unread        *  02970
*           END-THEN for record one read                             *  02980
*           END-THEN for dasd operation                              *  02990
*-------------------------------------------------------------------*  03000
COMPARE   STGTHLDH = STGTHLDH @ XFF      *COMPLEMENT                    03010
          STGTHLDL = STGTHLDL @ XFF                                     03020
          STGTHLDL = STGTHLDL + TRACKUL  *ADD TRACK USED                03030
          STGTHLDH = STGTHLDH + TRACKUH + C *CARRY MEANS TRACK USED >   03040
                                         * STAGE THRESHOLD              03050
          BCY  DONE                                                     03060
          USETIRG IRG SECD PL2_SECD      *SWITCH TO PASS LINK 2         03070
          ADDRESSH = $SSA_TABL           *SET UP ADDRESS OF SAVE AREA   03080
          ADDRESSL = :SA_DIOCH                                          03090
          PL2DIDCY > (ADDRESS).INC       *STORE DID.C                   03100
          PL2CHD > (ADDRESS)             *STORE C.H                     03110
          USETIRG IRG SECD RTN_SECD      *SWITCH TO RETURN GROUP        03120
          RETCODE = NE_RDSTG             *NORMAL END READ STAGE PARMS   03130
          B    DONE                                                     03140
                                                                        03150
*-------------------------------------------------------------------*  03160
*           ELSE-DO for cache operation                              *  03170
*              IF 'prestaging allowed' flag set (SST)                *  03180
*-------------------------------------------------------------------*  03190
ELSE      JH   SST_DFLG.BITPRALL,ALLOWED *BRANCH IF PRESTAGING ALLOWED  03200
          B    DONE                      *OTHERWISE BRANCH TO DONE      03210
                                                                        03220
*-------------------------------------------------------------------*  03230
*           THEN-DO for prestaging allowed                           *  03240
*              IF last record read and references-to-frame at least 3 * 03250
*                 THEN-DO for last record read and at least 3 references* 03260
*                    Set 'prestage' local flag                       *  03270
*                    Get tracks/cylinder and cyls/device from device type* 03280
*                       descriptor                                   *  03290
*-------------------------------------------------------------------*  03300
```

```
ALLOWED    JL      FLAG1.LASTREC.GOTODONE      *BRANCH IF NOT LAST RECORD
           ACCCOUNT = ACCCOUNT + XFD           *CARRY IF ACCCOUNT >= 3
           BCY     THEN3                       *BRANCH IF ACCCOUNT >=3
GOTODONE   B       DONE                        *BRANCH TO DONE
THEN3      LOCFLAGS = LOCFLAGS / SETLPRES      *SET LOCAL PRESTAGE FLAG
           ADDRESSH = $DTD_TABL                *SET UP ADDRESS OF DTD TABLE
           JH      SST_DFLG.BITDEVTA.TYPEA2    *BRANCH IF DEVICE TYPE A
           ADDRESSL = :DFHDTRKB
           XXTRKCYL < (ADDRESS)                *GET TRACKS/CYL DEV B
           ADDRESSL = :DCYLDVB
           CYLSDEV < (ADDRESS)                 *GET CYLS PER DEVICE B
           B       CHECK
TYPEA2     ADDRESSL = :DFHDTRKA
           XXTRKCYL < (ADDRESS)                *GET TRACKS/CYL DEV A
           ADDRESSL = :DCYLDVA
           CYLSDEV < (ADDRESS)                 *GET CYLS PER DEVICE A

*-------------------------------------------------------------------*
*                Increment head address                             *
*                IF head address greater than tracks/cylinder       *
*                    THEN-DO for head address overflow              *
*                        Set head address to 0                      *
*                        Increment cylinder address                 *
*                        IF cylinder address greater than cylinders/dev *
*                            THEN reset 'prestage' local flag       *
*                    END-THEN for head address overflow             *
*-------------------------------------------------------------------*
CHECK      USETIRG IRG_SECD PL2_SECD           *SWITCH TO PL2
           PL2HEAD = PL2HEAD + X01             *INCREMENT HEAD ADDRESS
           TRKCYL = TRKCYL @ XFF               *COMPLEMENT
           TRKCYL = TRKCYL + PL2HEAD           *CARRY MEANS HEAD OVERFLOW
           BNCY    OK                          *BRANCH IF NO OVERFLOW
           PL2HEAD = X00                       *ZERO HEAD
           PL2CYLL = PL2CYLL + X01             *INCREMENT CYL ADDRESS
           PL2CYLH = PL2CYLH + X00 + C
           CYLSDEVH = CYLSDEVH @ XFF           *COMPLEMENT
           CYLSDEVL = CYLSDEVL @ XFF
           CYLSDEVL = CYLSDEVL + PL2CYLL       *ADD CURRENT CYLINDER ADDRESS
           CYLSDEVH = CYLSDEVH + PL2CYLH + C
           BNCY    OK                          *BRANCH IF NO OVERFLOW
           LOCFLAGS = LOCFLAGS . RESLPRES      *RESET LOCAL PRESTAGE FLAG

*-------------------------------------------------------------------*
*                IF 'prestage' local flag on                        *
*                    THEN-DO for prestage flag on                   *
*                        Set read stage parameters return code      *
*                        Set 'prestage' flag (SST)                  *
*                        Set up incremented DID.C.C.H for Read Stage Parm*
*                    END-THEN for prestage flag on                  *
*                END-THEN for last record read and at least 3 reference*
*            END-THEN for prestage allowed on this device           *
*        END-ELSE for cache operation                               *
*                                                                   *
*    END-ELSE for staging possible                                  *
*-------------------------------------------------------------------*
OK         JL      LOCFLAGS.LPRESTAG.DONE      *BRANCH IF PRESTAGE FLAG NOT SE
           USETIRG IRG_SECD RTN_SECD           *SWITCH TO RETURN REGS
           RETCODE = NE_RDSTG                  *SET READ STAGE PARMS RET CODE
           USETIRG IRG_SECD SST_SECD           *SWITCH TO SST
           SST_FLAG = SST_FLAG / SETPREST      *SET PRESTAGE FLAG
           USETIRG IRG_SECD PL2_SECD           *SWITCH TO PL2
           ADDRESSH = $SSA_TABL
           ADDRESSL = :SA_DIDCH                *SET UP ADDRESS OF SAVE AREA
           PL2DIDCY > (ADDRESS).INC            *STORE DID.C
           PL2CHD > (ADDRESS)                  *STORE C.H

*-------------------------------------------------------------------*
*  (end of segment)                                                 *
*-------------------------------------------------------------------*
DONE       URETURN                             *RETURN TO CALLER

END
```

MODULE: END CHANNEL PROGRAM PROCESSING
SUBMODULE: DEALLOCATION DETERMINATION 2.4.5.3 SUBMODULE: DEALLOCATION DETERMINATION

```
*****************  START OF SPECIFICATIONS  *****************   00020
*                                                           *   00030
* SUBMODULE NAME: MDFGDDS4                                  *   00040
*                                                           *   00050
* SUBMODULE TITLE: DEALLOCATION DETERMINATION               *   00060
*                                                           *   00070
* PARENT MODULE: MDFGDD01                                   *   00080
*                                                           *   00090
* FUNCTIONAL DESCRIPTION                                    *   00100
* ---------- -----------                                    *   00110
* The Deallocation routine makes deallocation decisions based *  00120
* on data contained in the End Channel Program command. No frames * 00130
* are deallocated if no writes occurred. One frame is       *   00140
* deallocated if a regular write occurred or the last record on the * 00150
* track was read. A series of frames from within a cylinder are * 00160
* deallocated if a write occurred with the 'multitrack' flag or the * 00170
* 'head switch' flags set. Permanent deallocation occurs if Cache * 00180
* read errors were encountered on a frame. If the track is no longer * 00190
* needed in the Cache (last record read or track switching), the * 00200
* frame is deallocated even if no writes occurred.          *   00210
*                                                           *   00220
* The following tasks are part of Frame Deallocation:       *   00230
*                                                           *   00240
* - Frame invalidation decision                             *   00250
* - Frame invalidation                                      *   00260
*       - by track                                          *   00270
*       - by cylinder region                                *   00280
*       - by cylinder                                       *   00290
* - Permanent frame deallocation                            *   00300
*                                                           *   00310
* ERRORS DETECTED:                                          *   00320
*                                                           *   00330
* If a track is to be deallocated but it is not found in the *   00340
* directory, a serious error has occurred and the Cache Manager * 00350
* 'halts'.                                                  *   00360
*                                                           *   00370
* OPERATIONAL DESCRIPTION                                   *   00380
* ----------- -----------                                   *   00390
* The flag bytes are scanned in such a way that the most serious * 00400
* type of deallocation required will be the first found. Then the * 00410
* proper deallocation routine is called to deallocate a range, a DID, * 00420
* a frame, or permanently deallocate a frame.               *   00430
*                                                           *   00440
* INTERNAL ITEMS    NAME         DESCRIPTION/PARAMETERS     *   00450
* --------- -----   ----         ---------------------      *   00460
* ROUTINES USED:    MDFGDSA5     Permanently Deallocate Frame * 00470
*                   MDFGDSA8     Deallocate Range           *   00480
*                   MDFGDSB2     Get Last Seek              *   00490
*                   MDFGDSA7     Deallocate Frame           *   00500
* MACROS USED:      URETURN      Return                     *   00510
*                   UHALT        Halt Error                 *   00520
*                   USETIRG      Change The IRG             *   00530
*                   UCALLMOD     Call A Module              *   00540
* DATA STRUCTURES:  none                                    *   00550
* INTERNAL REGS:    >            >(R/W)   >                 *   00560
* EXTERNAL REGS:    IRG          W        Register Group Pointer * 00570
*                                                           *   00580
* ENTRY IRG:        P(Ex Stk)    EXIT IRG:  P(Ex Stk)       *   00590
*                   S(RTN)                  S(varies)       *   00600
*                                                           *   00610
* CHANGE ACTIVITY                                           *   00620
* ------ --------                                           *   00630
* 07/24/81         12 COMPLETED (MODULE SIZE = ??? words)   *   00640
*                                                           *   00650
*****************  END OF SPECIFICATIONS  *******************   00660
```

```
*-------------------------------------------------------------*    00680
*   LOCALS                                                    *    00690
*-------------------------------------------------------------*    00700
ACCCOUNT  DEF   P0                *ACCESS COUNT                    00710
LOCFLAGS  DEF   P1                *LOCAL FLAGBYTE                  00720
DEALLOC   DEF   0                 *DEALLOC FLAG                    00730
SETDEALL  DEF   X80               *SET FLAG                        00740
RESDEALL  DEF   X7F               *RESET FLAG                      00750
ADDRESS   DEF   P2P3                                               00760
ADDRESSH  DEF   P2                                                 00770
ADDRESSL  DEF   P3                                                 00780
XXERRDOM  DEF   P4P5              *ERROR DOMAIN ADDRESS            00790
ERRDOMAN  DEF   P5                                                 00800
ERRADDR   DEF   P4P5              *ERROR ADDRESS                   00810
XXTRKCYL  DEF   P4P5              *TRACKS PER CYLINDER             00820
TRKCYL    DEF   P5                                                 00830
OLDHEAD   DEF   P5                                                 00840
FLAGS     DEF   P6P7              *FLAG BYTES                      00850
FLAG0     DEF   P6                *FLAG BYTE 0                     00860
DASDRERR  DEF   0                    *DASD READ ERROR              00870
CACHRERR  DEF   2                    *CACHE READ ERROR             00880
IMBCYLSK  DEF   3                    *IMBEDDED CYLINDER SEEK       00890
TRSWITCH  DEF   4                    *TRACK SWITCH                 00900
WRITEOCC  DEF   5                    *WRITE OCCURRED               00910
IMBHDSK   DEF   6                    *IMBEDDED HEAD SEEK           00920
CHANLRES  DEF   7                    *CHANNEL INTERFACE RESET      00930
FLAG1     DEF   P7                *FLAG BYTE 1                     00940
FIRSTREC  DEF   0                    *FIRST RECORD READ            00950
LASTREC   DEF   1                    *LAST RECORD READ             00960
EOFREC    DEF   2                    *EOF RECORD READ              00970
UPSKONLY  DEF   3                    *UPDATE SEEK ONLY             00980
DASDOPER  DEF   4                    *DASD OPERATION               00990
                                                                   01000
*-------------------------------------------------------------*    01010
*  ENTRY END CHANNEL PROGRAM PROCESSING                       *    01020
*-------------------------------------------------------------*    01030
          START MDFGDDS4                                           01040
          ORG   MDFGDDS4                                           01050
MDFGDDS4  ADDRESSH = $SAVEP4P5    *SET UP ADDRESS TO SAVE P4P5     01060
          ADDRESSL = :SAVEP4P5                                     01070
          P4P5 > (ADDRESS)        *SAVE P4P5 TO FREE REG SPACE     01080
                                                                   01090
*-------------------------------------------------------------*    01100
*  Reset 'dealloc' flag off (L)                               *    01110
*-------------------------------------------------------------*    01120
          LOCFLAGS = LOCFLAGS . RESDEALL  *RESET DEALLOC FLAG      01130
                                                                   01140
*-------------------------------------------------------------*    01150
*  SELECT on flag bytes                                       *    01160
*                                                             *    01170
*    DO-WHEN cache read error                                 *    01180
*      CALL Permanently Deallocate Frame                      *    01190
*        PASS: DID.C.C.H. error address                       *    01200
*        RECEIVE: Return Flag                                 *    01210
*      IF frame not found return flag                         *    01220
*        THEN HALT 60 - cache read error on frame not found   *    01230
*    END-WHEN cache read error                                *    01240
*-------------------------------------------------------------*    01250
          USETIRG IRG SECD PL2_SECD   *SWITCH TO PL2               01260
          JH    * FLAG0.CACHRERR,LABEL *BRANCH IF CACHE READ ERROR 01270
          B     WHEN2                 *JL WON'T REACH              01280
LABEL     ADDRESSH = $RCVBUF          *SET UP ADDRESS OF ERROR DOMAIN 01290
          ADDRESSL = :RCV_ERRD                                     01300
          XXERRDOM < (ADDRESS)        *GET ERROR DOMAIN            01310
          PL2ERRDM = ERRDOMAN         *PASS ERROR DOMAIN           01320
          ADDRESSL = :RCV_ERRA        *SET UP ADDRESS OF ERROR ADDR 01330
          ERRADDR < (ADDRESS)         *GET ERROR ADDRESS           01340
          PL2ERRAA = ERRADDR          *PASS ERROR ADDRESS          01350
                                      *DID.C.C.H IS ALREADY IN PL2 01360
          UCALLMOD MDFGDSA5           *PERM DEALLOC FRAME          01370
          JH    RETFLAG.NOTFOUND,HALT1 *BRANCH IF FRAME NOT FOUND  01380
          B     ESELECT1                                           01390
HALT1     UHALT HALT_X60              *CACHE RD ERROR FRAME NOT FOUND 01400
                                                                   01410
*-------------------------------------------------------------*    01420
*    DO-WHEN write occurred                                   *    01430
*      SELECT on flags                                        *    01440
*-------------------------------------------------------------*    01450
```

```
WHEN2     JH    FLAG0.WRITEOCC,SELECT2      *BRANCH IF WRITE OCCURRED              01460
          B     WHEN3                       *BRANCH TO NEXT WHEN                   01470
                                                                                   01480
*---------------------------------------------------------------*                  01490
*                                                               *                  01500
*       DO-WHEN imbedded head seek                              *                  01510
*         Get tracks/cyl for this device type (DTD)             *                  01520
*         CALL Deallocate Range                                 *                  01530
*           PASS: DID.C.C.0, tracks/cyl (deallocate cylinder)   *                  01540
*           RECEIVE: Return flag byte                           *                  01550
*       END-WHEN imbedded head seek                             *                  01560
*---------------------------------------------------------------*                  01570
SELECT2   JH    FLAG0.IMBHDSK,LABEL2        *BRANCH IF HEAD SEEK                   01580
          B     WHEN22                      *JL WON'T REACH                        01590
LABEL2    USETIRG IRG SECD SST_SECD         *SWITCH TO SST                         01600
          ADDRESSH = $DTD_TABL              *SET UP ADDRESS OF DTD                 01610
          JH    SST_DFLG.BITDEVTA,TYPEA     *JUMP IF TYPE A                        01620
          ADDRESSL = :DFHDTRKB                                                     01630
          XXTRKCYL < (ADDRESS)              *GET TRACKS/CYLINDER B                 01640
          B     CALLIT                                                             01650
TYPEA     ADDRESSL = :DFHDTRKA                                                     01660
          XXTRKCYL < (ADDRESS)              *GET TRACKS/CYLINDER A                 01670
CALLIT    USETIRG IRG SECD PL2_SECD         *SWITCH TO PL2                         01680
          PL2HEAD = X00                     *LOWER LIMIT = 0                       01690
          PL2HEAD2 = TRKCYL                 *UPPER LIMIT = TRACKS/CYL              01700
          UCALLMOD MDFGDSAB                 *DEALLOCATE RANGE                      01710
          B     ESELECT1                                                           01720
                                                                                   01730
*---------------------------------------------------------------*                  01740
*                                                               *                  01750
*       DO-WHEN track switch                                    *                  01760
*         CALL Get Last Seek                                    *                  01770
*           PASS: DID                                           *                  01780
*           RECEIVE: DID.C.C.H (old)                            *                  01790
*         CALL Deallocate range                                 *                  01800
*           PASS: DID.C.C.H (old), H (new)                      *                  01810
*           RECEIVE: Return flag byte                           *                  01820
*       END-WHEN track switch                                   *                  01830
*---------------------------------------------------------------*                  01840
WHEN22    JL    FLAG0.TRSWITCH,WHEN23       *BRANCH IF NO TRACK SWITCH             01850
          UCALLMOD MDFGDSB2                 *GET LAST SEEK                         01860
          OLDHEAD = RTNHD1                  *MAKE COPY OF OLD HEAD                 01870
          USETIRG IRG SECD PL2_SECD         *SWITCH TO PL2                         01880
          PL2HEAD2 = PL2HEAD                *UPPER LIMIT IS CURRENT HEAD           01890
          PL2HEAD = OLDHEAD                 *LOWER LIMIT IS OLD HEAD               01900
          UCALLMOD MDFGDSAB                 *DEALLOCATE RANGE                      01910
          B     ESELECT1*(IGNORE RETURN FLAG)                                      01920
                                                                                   01930
*---------------------------------------------------------------*                  01940
*       DO-WHEN not dasd operation                              *                  01950
*         Set 'dealloc' flag (L)                                *                  01960
*       END-WHEN not dasd operation                             *                  01970
*       OTHERWISE null                                          *                  01980
*     END-SELECT on flags                                       *                  01990
*   END-WHEN write occurred                                     *                  02000
*---------------------------------------------------------------*                  02010
WHEN23    JH    FLAG1.DASDOPER,ESELECT2     *BRANCH IF ON DASD                     02020
          LOCFLAGS = LOCFLAGS / SETDEALL    *SET DEALLOC FLAG                      02030
ESELECT2  B     ESELECT1                                                           02040
                                                                                   02050
*---------------------------------------------------------------*                  02060
*   DO-WHEN imbedded cylinder seek and not dasd operation       *                  02070
*     Set 'dealloc' flag on (L)                                 *                  02080
*   END-WHEN imbedded cylinder seek and not dasd operation      *                  02090
*---------------------------------------------------------------*                  02100
WHEN3     JL    FLAG0.IMBCYLSK,WHEN4        *BRANCH IF NO IMBEDDED SEEK            02110
          JH    FLAG1.DASDOPER,WHEN4        *OR ON DASD                            02120
          LOCFLAGS = LOCFLAGS / SETDEALL    *SET DEALLOC FLAG                      02130
          B     ESELECT1                                                           02140
                                                                                   02150
*---------------------------------------------------------------*                  02160
*   DO-WHEN last record read and not on dasd                    *                  02170
*     Set 'dealloc' flag on (L)                                 *                  02180
*   END-WHEN imbedded seek and not on dasd                      *                  02190
*   OTHERWISE null                                              *                  02200
* END-SELECT on flag bytes                                      *                  02210
*---------------------------------------------------------------*                  02220
WHEN4     JL    FLAG1.LASTREC,ESELECT1      *BRANCH IF NOT LAST RECORD             02230
          JH    FLAG1.DASDOPER,ESELECT1     *BRANCH IF DASD OPERATION
          LOCFLAGS = LOCFLAGS / SETDEALL    *SET DEALLOC FLAG
```

```
*---------------------------------------------------------*    02240
                                                                02250
* IF 'dealloc' flag set on (L)                             *    02260
*    THEN-DO for 'dealloc' flag set                        *    02270
*       CALL Deallocate Frame                              *    02280
*          PASS: DID.C.C.H                                 *    02290
*          RECEIVE: Return flags                           *    02300
*       IF 'not found' return flag set                     *    02310
*          THEN HALT 61 - deallocation for frame not found *    02320
*    END-THEN for 'not found' flag set                     *    02330
*---------------------------------------------------------*    02340
ESELECT1 JL    LOCFLAGS.DEALLOC,DONE    *BRANCH IF DEALLOC NOT SET    02350
         USETIRG IRG.SECD PL2_SECD      *SWITCH TO PL2                02360
         UCALLMOD MDFGDSA7              *DEALLOC FRAME                02370
         JL    RETFLAG.NOTFOUND,DONE    *BRANCH IF FOUND              02380
         UHALT HALT_X61                 *DEALLOCATION ON FRAME NOT FND 02390
                                                                02400
*---------------------------------------------------------*    02410
* Return                                                   *    02420
*---------------------------------------------------------*    02430
DONE       ADDRESSH = $SAVEP4P5         *SET UP TO FETCH SAVED P4P5  02440
           ADDRESSL = :SAVEP4P5                                      02450
           P4P5 < (ADDRESS)             *GET SAVED P4P5              02460
           URETURN                      *RETURN TO CALLER            02470
SAVEP4P5 DC   0                         *SAVE AREA FOR P4P5          02480
                                                                02490
           END                                                  02500
```

We claim:

1. A method for increasing efficiency of operation of a computer system of the class comprising:
   a host computer including an arithmetic and logic unit and main memory means; and
   a data storage unit comprising a long-term magnetic data storage means, a solid-state caching memory means and a cache manager means,
   said data storage unit being connected to said host computer by a channel, said channel comprising means for communication of commands and data between said host computer and said data storage unit, the commands output by the host to the data storage unit in calling for data not including an indication of whether data called-for is part of a sequence of such requests;
   said method comprising the following steps, performed by said data storage unit solely under control of said cache manager, and external to said channel and said host computer:
   examining the data called for by the host from the long-term magnetic memory means;
   determining if the called-for data contains indicators indicating that the called-for data is not part of a sequential data stream;
   staging data not called for by said host computer to said cache memory means upon determination that said called-for data does not contain said indicators, said not called-for data staged to said cache memory being stored on said long-term magnetic storage media in a predetermined physical relationship to said called-for data; and
   avoiding staging data to said cache memory means upon determination that said called-for data contains indicators that the called-for data is not part of a sequential data stream.

2. The method of claim 1 wherein said indicators comprise commands contained within said called-for data directing additional data to be read from locations other than those disposed in said predetermined physical relationship to said called-for data on said long-term magnetic storage media.

3. The method of claim 1 wherein said data is stored on disk drive media organized into logical tracks and said staging is only performed when said indicators are not present and when said previously called-for data includes the starting portion of one of said logical tracks.

4. The apparatus of claim 1 wherein said long-term magnetic data storage means comprise disk drive means wherein data is stored on concentric tracks on disks, and said staging is performed with respect to an entire track at a time, successive tracks being staged to said cache as previously staged tracks are called for by said host.

5. Method for improving the efficiency of a data processing system of the type comprising a host computer connected via channel means to a memory system comprising a solid-state cache memory means and long-term data storage means, said host being adapted to issue commands calling for specific data records stored on said long-term storage means, said commands not including an indication of whether a particular request is one of a group of requests for data stored sequentially on said long-term storage means, comprising the steps of:
   examining each individual host originated command calling for a particular data record and the contents of the solid-state cache memory means to determine whether the data thus called for is stored in said solid-state memory means external to said channel, and, if said data is stored in said solid-state memory means, transmitting said data to said host;
   if said data is not stored in said solid-state memory means, accessing said data on said long-term data storage means and passing it over said channel means to said host, and examining said data passed from said long-term data storage means to said host in order to determine whether said called-for record is one of a sequence of such records; and
   if said determination indicates that said called-for record may be one of such a sequence, determining the next record in said sequence and reading said next record from said long-term storage means into said solid-state memory means in anticipation of said next record being subsequently called for by said host.

6. The method of claim 5 wherein the determination that a given record is one of a sequence is accomplished by examination of said record for indicators signaling that said data is not part of such a sequence.

7. The method of claim 6 wherein said long-term data storage means comprises magnetic disk drive means, said disks being organized into tracks, said indicators signaling that a given record is not part of a sequence of such records comprising commands instructing that records not on the same track of the same disk be supplied to said host.

8. The method of claim 5 wherein said records are stored on long-term storage means, said long-term storage means comprising disk drive means adapted to store data organized into tracks, said data being read from said long-term storage means into said solid-state memory means track by track.

9. A method of control of storage of digital data in storage means comprising:
long-term magnetic storage means;
faster access solid-state cache memory means; and
controller means;
said method comprising the steps of:
examining the sequence of commands output by a host computer in order to access data required, said commands not including an indication of whether said data required is part of a sequential data stream, and the data accessed by the host computer, for indicators that said data is not part of a sequential data stream;
staging a quantity of additional data to said cache memory means where said indicators are not present, in anticipation of said additional data being subsequently called for by said host computer; and
avoiding staging additional data to said cache means where said indicators are present.

10. The method of claim 9 wherein said examining step comprises the step of determining whether said sequence of commands includes instructions to read other data not stored sequentially on said long-term storage means with respect to said data required.

11. Apparatus for storage and retrieval of digital data for connection to a host computer of the type outputting commands for retrieval of data, said commands not including explicit indication of whether a particular data request is one of a sequence of requests for sequential portions of a given data file, said apparatus comprising:
long-term data storage means;
solid-state cache memory means; and
cache controller means;
said cache controller means being adapted to examine commands output by said host in effectuating retrieval of data, and to examine said data for embedded commands, said controller being adapted to determine whether said commands indicate that a particular data request is likely not to be part of a sequence of such requests, and to stage additional data from said long-term memory means to said cache memory means if no such indicators are present in the processing of a particular data request, in anticipation of further requests for sequential portions of a given data record.

12. The apparatus of claim 11 wherein said long-term data storage means comprises magnetic disk drive storage means wherein said data stored on said disks is organized into logical tracks and said data is staged from said disk drives to said cache memory means in multiples of one track.

* * * * *